(12) United States Patent
Sanders et al.

(10) Patent No.: US 8,415,278 B2
(45) Date of Patent: Apr. 9, 2013

(54) COMPOSITIONS AND METHODS FOR BREAKING A VISCOSITY INCREASING POLYMER AT VERY LOW TEMPERATURE USED IN DOWNHOLE WELL APPLICATIONS

(75) Inventors: Michael W. Sanders, Duncan, OK (US); Jeffrey L. Mundy, Duncan, OK (US); Fong Fong Foo, Duncan, OK (US); Rajesh K. Saini, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/039,777

(22) Filed: Mar. 3, 2011

(65) Prior Publication Data

US 2011/0152132 A1    Jun. 23, 2011

Related U.S. Application Data

(62) Division of application No. 11/656,651, filed on Jan. 23, 2007, now Pat. No. 7,923,417.

(51) Int. Cl.
*E21B 43/26* (2006.01)
*C09K 8/68* (2006.01)

(52) U.S. Cl. ........ 507/249; 507/213; 507/241; 507/244; 507/255; 507/256; 507/259; 507/267; 507/268; 507/271; 166/305.1; 166/308.2

(58) Field of Classification Search .................. 507/249, 507/259
See application file for complete search history.

(56) References Cited

U.S. PATENT DOCUMENTS

| | | | |
|---|---|---|---|
| 4,588,506 A * | 5/1986 | Raymond et al. ............. 210/606 |
| 4,928,763 A | 5/1990 | Falk |
| 4,950,995 A * | 8/1990 | Falk .............................. 324/323 |
| 5,325,921 A * | 7/1994 | Johnson et al. ............. 166/280.1 |
| 5,624,886 A * | 4/1997 | Dawson et al. ................ 507/217 |
| 5,783,527 A * | 7/1998 | Dobson et al. ................ 507/269 |
| 6,138,760 A * | 10/2000 | Lopez et al. ................... 166/300 |
| 6,494,263 B2 * | 12/2002 | Todd ............................. 166/312 |
| 6,722,438 B2 * | 4/2004 | Sask ............................. 166/312 |
| 6,793,018 B2 * | 9/2004 | Dawson et al. ................ 166/300 |
| 6,828,280 B2 * | 12/2004 | England et al. ............... 507/202 |
| 7,144,844 B2 * | 12/2006 | Qu et al. ....................... 507/214 |
| 7,159,658 B2 * | 1/2007 | Frost et al. .................... 166/300 |
| 7,923,417 B2 | 4/2011 | Sanders et al. |
| 7,928,040 B2 | 4/2011 | Sanders et al. |
| 2004/0186024 A1 * | 9/2004 | Todd ............................. 507/200 |

* cited by examiner

*Primary Examiner* — John J Figueroa
(74) *Attorney, Agent, or Firm* — Robert A. Kent; Booth Albanesi Schroeder LLC

(57) ABSTRACT

A composition for treating a portion of a wellbore or a portion of a subterranean formation is provided, the composition comprising: (a) water; (b) a source of hydrogen peroxide, and (c) an activator for the source of hydrogen peroxide; wherein the pH of the composition is adjusted to be within an appropriate range for the type of activator. A method for treating a portion of a wellbore or a portion of a subterranean formation, the method comprising the steps of: forming or providing a composition comprising: (a) water; (b) a source of hydrogen peroxide, and (c) an activator for the source of hydrogen peroxide; wherein the pH of the composition is adjusted within an appropriate range for the type of activator; and introducing the composition through a wellbore to treat a portion of a wellbore or a portion of a subterranean formation. The activator can be a water-soluble alkanoyl-donor compound or a chelated transition metal. Preferably, the composition further comprises an iron chelating agent. The composition and method are adapted for breaking a viscosity increasing polymer, such as xanthan. The method has particular applications where the static temperature of the portion of the wellbore or the portion of the subterranean formation to be treated is less than 100° F. (38° C.).

7 Claims, No Drawings

COMPOSITIONS AND METHODS FOR BREAKING A VISCOSITY INCREASING POLYMER AT VERY LOW TEMPERATURE USED IN DOWNHOLE WELL APPLICATIONS

CROSS-REFERENCE TO RELATED APPLICATIONS

This application is a divisional of U.S. patent application Ser. No. 11/656,651 filed on Jan. 23, 2007 now U.S. Pat. No. 7,923,417.

STATEMENT REGARDING FEDERALLY SPONSORED RESEARCH OR DEVELOPMENT

Not Applicable

REFERENCE TO A MICROFICHE APPENDIX

Not applicable

BACKGROUND

Hydrocarbons (e.g., oil and natural gas) in a hydrocarbon-bearing zone of a subterranean formation can be reached by drilling a wellbore into the earth, either on land or under the sea that penetrates into the hydrocarbon-bearing formation. Such a wellbore can be used to produce hydrocarbons or as an injector well to inject a fluid, e.g., water or gas, to drive the relevant fluids/gasses into a production wellbore. Typically, such a wellbore must be drilled thousands of feet into the earth to reach the hydrocarbon-bearing formations. Usually, but not always, the greater the depth of the well, the higher the natural "static" temperature of the formation.

After drilling an openhole, the next step is referred to as "completing" the wellbore. A wellbore is sometimes completed openhole, that is, without cemented casing in place adjacent to the producing formations. More typically, however, as part of the well completion process, a metal pipe, known as "casing" is positioned and cemented into place in the openhole.

The main purpose of cementing the casing is to stabilize the wellbore against collapse and to prevent undesirable migration of fluids along the wellbore between various zones of subterranean formations penetrated by the wellbore. Where the wellbore penetrates into a hydrocarbon-bearing zone of a subterranean formation, the casing can be perforated to allow fluid communication between the zone and the wellbore. A zone of a wellbore that penetrates a hydrocarbon-bearing zone that is capable of producing hydrocarbon is referred to as a "production zone." The casing also enables subsequent or remedial separation or isolation of one or more production zones of the wellbore, for example, by using downhole tools such as packers or plugs, or by using other techniques, such as forming sand plugs or placing cement in the perforations.

Whether the wellbore is openhole or cased, various procedures are often employed to complete the wellbore in preparation for production of hydrocarbons. For example, one common procedure is gravel packing to help prevent sand and fines from flowing with the hydrocarbon produced into the wellbore. This particulate material can be damaging to pumps and other oilfield equipment and operations. Another example of a common procedure to stimulate the flow of hydrocarbon production from the hydrocarbon-bearing zones is hydraulic fracturing of a formation. This procedure is often referred to as "fracking," to provide an improved flow path for hydrocarbons to flow from the hydrocarbon-bearing formation to the wellbore. It is also common, for example, to gravel pack after a fracturing procedure, and such a combined procedure is sometimes referred to as a "frac-packing."

After a well has been completed and placed into production, from time to time it is helpful to workover a well by performing major maintenance or remedial treatments. Workover includes the stimulation or remediation of a well to help restore, prolong, or enhance the production of hydrocarbons. During well servicing or workover, various treatment procedures may be used, including for example, gravel packing, hydraulic fracturing, and frac-packing as mentioned for well completion.

All of these procedures, from drilling the wellbore, to completion, to workover, employ appropriate fluids. During the initial drilling and construction of the wellbore, the fluids are often referred to as drilling fluids. In other stages, such as well completion, servicing, or workover, the fluids introduced into the wellbore are often referred to as treatment fluids, completion fluids, or workover fluids. A well treatment fluid is used for a wide range of purposes, such as stimulation, isolation, or control of reservoir gas or water or formation particles. As used herein, however, a "treatment fluid" includes any appropriate fluid to be introduced into a wellbore, whether during drilling, completion, servicing, workover, or any other such stage.

More particularly, for example, a treatment performed to enhance or restore the productivity of a well is called a stimulation treatment. Stimulation treatments fall into two main groups, matrix treatments and hydraulic fracturing treatments.

Matrix treatments are performed below the reservoir fracture pressure and generally are designed to restore or enhance the natural permeability of the reservoir in the near-wellbore area. Matrix operations can include treating the formation with an acid to dissolve some of the acid soluble rock material. For various reasons known in the art, is sometimes desirable to perform a matrix treatment with a viscosified or gelled fluid.

Fracturing treatments are performed above the fracture pressure of the reservoir formation and create a highly conductive flow path between the reservoir and the wellbore. In general, hydraulic fracturing involves injecting a fracturing fluid through the wellbore and into an oil and gas bearing subterranean formation at a sufficiently high rate of fluid flow and at a sufficiently high pressure to initiate and extend one or more fractures in the formation. To conduct hydraulic pressure through the wellbore, the fracturing fluid must be relatively incompressible under the treating conditions. In addition, because of the large quantities of fracturing fluid required, the fracturing fluid is preferably based on readily-available and plentiful fluid. Thus, the typical fracturing fluid is based on water.

The fracturing fluid is injected through the wellbore at such a high flow rate and under such high pressure that the rock of the subterranean formation that is subjected to the hydraulic treatment literally cracks apart or fractures under the strain. When the formation fractures, the pressure is relieved as the fracturing fluid starts to move quickly through the fracture and out into the formation. The theoretical objective of forming such a fracture in the rock of the formation is to create a large surface area of the faces of the fracture. The large surface area allows oil and gas to flow from the rock of the subterranean formation into the facture, which provides an easy path for the oil and gas to easily flow into the well.

However, once the high pressure is relieved by the escape of the fracturing fluid through the created fracture and out further into the subterranean formation, the fracture has a tendency to be squeezed closed by the natural pressures on the rock within the deep subterranean formation. To keep the fracture open, some kind of material must be placed in the fracture to prop the faces of the fracture apart.

The desirable material for the purpose of propping the fracture apart must meet several criteria. For example, the material must have a sufficient strength not to be entirely crushed by the natural forces tending to push the fracture closed. The material must be capable of being fluidized so that it can flow with or immediately following the fracturing fluid. Additionally, the material also must itself not block or seal the fracture. Thus, a typical material used for the purpose of propping open a fracture is sand. Sand, in the aggregate, has a sufficiently high mechanical strength to prop open a fracture in a subterranean formation at typical depths and natural subterranean pressures; it can behave as a fluid in that it can be poured and flow; and the particles, even when tightly compacted, have a network of void spaces between them that can provide high porosity and thus high permeability, thus allowing the produced fluids to flow through the propped fracture.

While sand is the most commonly used material for the purpose of propping the fracture open, many other materials of the appropriate size range and mechanical strength can be used. In the oil and gas industry, any suitable particulate material that is used for the purpose of propping open a fracture produced by hydraulic fracturing is called a "proppant."

To be able to carry and place a proppant into a newly-created fracture, a fluid must have a sufficient viscosity to suspend and carry the proppant. In a low viscosity fluid, for example, the proppant would have a tendency to simply fall under gravity toward the bottom of the well instead of being carried with the fracturing fluid out into the newly-created fracture. For a fluid to be able to carry the proppant instead of having the proppant fall out of the fluid, the fracturing fluid needs to be made to have a much higher viscosity than that of water. Preferably, the fracturing fluid is a gel, which has a very high viscosity and great capacity for carrying a proppant suspended in the fluid.

Using a water-soluble polymeric material, such as a guar gum, is one of the ways to build viscosity in aqueous systems. Such a gum can be mixed with an aqueous fluid for use in a well to increase fluid viscosity. A sufficient concentration of the guar gum in an aqueous system can form a gel. Furthermore, the gum also can be crosslinked with other compounds to create a suitably viscous fluid, which is highly advantageous to transporting a proppant in a hydraulic fracturing procedure.

Another type of treatment for a subterranean formation is gravel packing, which is used to help control production of formation particles and to help control fines migrations. "Fines" are tiny particles, typically with a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be very harmful to pumping equipment.

In general, gravel packing involves placing sand or gravel around the wellbore to help filter out the formation particles and prevent them from flowing into the well with the produced fluids. Like with placing a proppant in a subterranean formation during hydraulic fracturing, a gelled fluid can be used to help place the gravel in a gravel packing operation. However, it is possible to use various fluids, both viscosified and non-viscosified, to help place the gravel pack, including water, brines, viscosified aqueous fluids, diesel, crude oil, viscosified diesel or crude, surfactant gels, etc.

After the proppant is mixed with the viscous fracturing fluid and pumped downhole to form a fracture, the fracturing fluid must be removed from the formation. It should be removed without moving the proppant from the fracture and without damaging the conductivity of the proppant bed. To accomplish this removal, the operator must thin the viscous fluid that transported the proppant to a very low viscosity near that of water for optimal removal from the propped fracture. Similarly, when a viscosified fluid is used for gravel packing, the viscosified fluid must be removed from the gravel pack. Reducing the viscosity of a viscosified fluid is referred to as "breaking" the fluid. Chemicals used to reduce the viscosity of fracturing fluids are called breakers.

Water-based fracturing fluids are usually made viscous by the addition of 20 to 70 pound (lb) of gelling polymer per 1,000 gallons (Mgal) of water (2.4-59 g/L). Typical gelling polymers include, for example, guar, guar derivatives, xanthan, chitosan, starch, starch derivatives, cellulose and cellulose derivatives.

For example, one of the most common gelling polymers used in the oil and gas industry is guar. Guar polymer, which is derived from the beans of a guar plant, is referred to chemically as a galactomannan gum. A mixture of guar dissolved in water forms a base gel, and suitable crosslinking agents are added to form a much more viscous fluid, called a crosslinked fluid. The water-based fluids discussed here may be crosslinked with metals ions, such as zirconium, titanium, or boron compounds. The viscosity of base gels are typically 20 to 50 cp; when it is crosslinked, the viscosity of the base gel is increased by 2 to 100 times depending on the temperature, test method, and type of crosslinker used.

Guar polymer is considered to have a molecular weight in the range of 2 to 4 million. Breakers reduce the molecular weight of guar polymer by cutting the long polymer chain. As the polymer chain is cut, the fluid's viscosity is reduced. For instance, reducing the guar polymer molecular weight to chains of about 10,000 molecular weight converts the fluid to near water-thin viscosity. A single guar polymer must be cut into approximately 200 small pieces to substantially eliminate its viscosity increasing effects.

On the other hand, crosslinking the guar increases its molecular weight to extremely high values. The crosslinking depends on the type of crosslinker, concentrations, temperature of the fluid, type of gelling polymer used, etc. Shear is required to properly mix the crosslinker and the gelling agent. Thus, the actual number of crosslinks that are possible and that actually form also depends on the shear level of the system: the total molecular weight is inversely proportional to the shear the fluid receives. The exact number of crosslink sites is not well known, but it could be as few as one to ten. The number of crosslinks, and thus the molecular weight of the resulting polymer, significantly alters fluid viscosity.

Crosslinks produced by borate ion are considered to be reversible and can be eliminated at neutral or acidic pH. Crosslinks formed by zirconium, titanium, antimony, and aluminum compounds, however, are considered to be not reversible and are broken by other methods than controlling pH. Fracturing fluid breakers are designed to reduce guar polymer viscosity by breaking down its molecular weight. This process can occur independently of crosslinking bonds existing between polymer chains. After the proppant is placed in the fracture and pumping stops, the fracture closes. The pores of the proppant bed and the surrounding formation are filled with the fracturing fluid and should be cleaned out. As noted above, the fracturing fluid must be removed to maximize conductivity of the proppant-filled fracture.

Removal of the fracturing fluid is facilitated by using breakers to reduce fluid viscosity. Unfortunately, another complicating factor also exists. As the hydraulic fracture is being formed and propagated in formations with permeability, fluid leaks from the fracture into the formation matrix. Because of the large size of the polymer, a filtration process occurs upon the fracture face. A filtercake of guar polymer is formed while the aqueous fluid, KCl, and breakers pass into the formation. Careful examination of this filtercake, which may be formed from crosslinked or uncrosslinked guar, reveals a semi-elastic, rubber-like membrane. Analysis shows the filtercake consists of approximately 95 percent water and 5 percent guar polymer. Even with this high water content, a filtercake can have these properties since the water is very tightly bound to the guar. The strength of hydrogen bonding between the polymer molecules makes the filtercake semi elastic and rubber like. Once the polymer concentrates it is difficult to solubilize the polymer. Non-filtercake fluid consists of approximately 99.5 percent water and 0.5 percent polymer. When the fracture closes, the permeability of the proppant bed may be damaged severely by the polymer filtercake. Viscosified gravel pack fluids need breakers, too. They may or may not form a filtercake on the formation face.

Breakers must be selected to meet the needs of each situation. First, it is important to understand the general performance criteria of breakers. In reducing the viscosity of the fracturing fluid to a near water-thin state, the breaker must maintain a critical balance. Premature reduction of viscosity during the pumping of a fracturing treatment can jeopardize the treatment. Inadequate reduction of fluid viscosity after pumping can also reduce production if the required conductivity is not obtained.

The ideal viscosity versus time profile would be if a fluid maintained 100% viscosity until the fracture closed on proppant and then immediately broke to a thin fluid. Some breaking inherently occurs during the 0.5 to 4.0 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature. A typical gravel pack break criteria is a 4-8 hour break time.

Several methods of characterizing the rheology of fracturing fluids are available. Rheological test results can be used to select a breaker or breaker package that gives the desired viscosity during and after pumping. The following criteria should also be considered when selecting a breaker: breaker influence on proppant transport; breaker influence on fracture conductivity; and economic considerations.

Chemical breakers used to reduce viscosity of natural gelling polymers used in fracturing or other subterranean applications such as guar and derivatized guar polymers are generally grouped into three classes: oxidizers, enzymes, and acids. All of these materials reduce the viscosity of the gel by breaking the polymer chain. The breakers operate by cleaving the backbone of polymer either by hydrolysis of acetal group, cleavage of glycosidic bonds, oxidative/reductive cleavage, free radical breakage or combination of these processes. A breaker should be selected based on its performance in the temperature, pH, time, and desired viscosity profile for each specific treatment.

Oxidizers commonly used to reduce viscosity of natural polymers includes, for example, sodium persulfate, potassium persulfate, ammonium persulfate, lithium and/or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation reduction chemical reactions occur as the polymer chain is broken.

Different oxidizers are selected based on their performance at different temperature and pH ranges. Consideration is also given to the rate of oxidation at a particular temperature and pH range. For example, the rate at which a persulfate molecule breaks into two radicals is temperature dependent. Below 120° F. (49° C.) this process occurs very slowly, and the reaction must be catalyzed to obtain acceptable break rates. A variety of catalysts, including various organic amines and inorganic materials, may be used for persulfate breakers. The optimum pH for persulfate oxidation is around 10 at low temperature (less than 150° F. or 66° C.). Above approximately 200° F. (93° C.), persulfate decomposes very quickly and breaks the polymer very quickly (i.e., with little delay in the break). Therefore, persulfate is not recommended as a breaker above 200° F. Similarly chlorites are used for high temperature breakage in the range of 150-350° F. with optimum pH range of 6-12. It can also be activated by catalysts such as cobalt acetate, EDTA, NTA, etc. Hypochlorites are generally used for low temperature breakage of natural polymers.

Enzymes are also used to break the natural polymers in oil field applications. They are generally used at low temperature (25 to 70° C. or 68° F. to 158° F.) as at higher temperature they denature and become ineffective. At very low temperatures enzymes are not as effective as rate of breakage of polymer is very slow and they are generally not recommended. Different types of enzymes are used to break different types of bond in the polysaccharides. Some enzymes break only α-glycosidic linkage and some break β-glycosidic linkage in polysaccharides. Some enzymes break polymers by hydrolysis and some by oxidative pathways. Generally Hemicellulase is used to break guar polymers and Xanthanase is used to break Xanthan polymers. A specific enzyme is needed to break a specific polymer/polysaccharide. Enzymes are referred to as Nature's catalysts because most biological processes involve an enzyme. Enzymes are large protein molecules, and proteins consist of a chain of building blocks called amino acids. The simplest enzymes may contain fewer than 150 amino acids while typical enzymes have 400 to 500 amino acids. Compared to persulfate with a molecular weight of 236, enzymes are large molecules with molecular weights in the range of 10,000. Compared to guar, which has an approximate molecular weight of 2-4 million, enzymes are small.

Acids also provide the same break via hydrolysis like enzymes. Acids, however, pose various difficulties for practical applications. Acids are not used as a polysaccharide polymer breaker very often because of cost, poor break rate control, chemical compatibility difficulties, and corrosion of metal goods.

In particular, there are few methods available to break viscosifying polymers, especially xanthan polymers, at very low temperatures (below 120° F./49° C.) and they suffer from various problems. For example, the use of hypochlorite poses corrosion concerns and may not provide sufficient delay of the break. The use of persulfate requires high concentrations at lower temperatures. The use of sodium chlorite is limited to high-temperature applications and may react violently to cause a fire when organic compounds are used in the process. Enzymes do not work well on xanthans.

Sodium perborate and ethyl acetoacetate ("EAA") has been reported as being capable of breaking a gel of a typical xanthan gum polymer ("XANVIS") down to 80° F. (27° C.). See Kelco Oilfield Group in its Technical Bulletin entitled "Breaker Applications," revised 01/04. However, we were unable to break a xanthan gel at very low temperature using the published recipe and the publication does not provide sufficient detail to allow the user to optimize the breaker recipe for a given set of conditions.

SUMMARY OF THE INVENTION

According to the invention, a composition for treating a portion of a wellbore or a portion of a subterranean formation is provided, the composition comprising: (a) water; (b) a source of hydrogen peroxide, and (c) an activator for the source of hydrogen peroxide; wherein the pH of the composition is adjusted to be within an appropriate range for the type of activator.

According to another aspect of the invention, a method for treating a portion of a wellbore or a portion of a subterranean formation is provided, the method comprising the steps of: forming or providing a composition comprising: (a) water; (b) a source of hydrogen peroxide, and (c) an activator for the source of hydrogen peroxide; wherein the pH of the composition is adjusted to be within an appropriate range for the type of activator; and introducing the composition through a wellbore to treat a portion of a wellbore or a portion of a subterranean formation.

The activator can be a water-soluble alkanoyl-donor compound (sometimes referred to herein as an acyl donor) or a chelated transition metal, or any combination thereof in any proportion. Preferably, the composition further comprises an iron chelating agent. The composition and method are adapted for breaking a viscosity increasing polymer, such as xanthan. The method has particular applications where the static temperature of the portion of the wellbore or subterranean formation to be treated is less than 100° F. (38° C.).

DETAILED DESCRIPTION OF PREFERRED EMBODIMENTS

The present invention comprises a breaker system for low temperatures which can be utilized for breaking a viscosity increasing polymer in water-based treating fluids used in gravel packs, fracturing, frac packs, fluid loss pills, drilling fluids, drill-in fluids, and the filtercakes formed by drilling or drill-in fluids, etc.

A composition and method of the present embodiment provides a means of treating a portion of a wellbore or a portion of a subterranean zone using a water-based treating fluid containing a delayed water-soluble polymer breaker. According to this embodiment, a water-based treating fluid comprises: (i) water, (ii) a delayed polymer breaker comprising a source of hydrogen peroxide and an activator (such as an acyl-donor compound or a chelated transition-metal catalyst), wherein the pH of the composition is adjusted to be within an appropriate range for the type of activator. According to this method, the water-based treating fluid is introduced into subterranean zone and the breaker is allowed to break the filtercake on the wall of the formation. Thereafter the broken filtercake and the treating fluid are recovered from the subterranean zone.

A composition and method of the present embodiment provides a means of treating a portion of a wellbore or a portion of a subterranean zone using a water-based treating fluid containing a delayed water-soluble polymer breaker (for gravel packs, fracturing, frac packs, fluid loss pills, drilling or drill-in fluids, etc.). According to this embodiment, a water-based viscous treating fluid comprises: (i) water, (ii) a viscosity increasing polymer, and (iii) a delayed polymer breaker comprising a source of hydrogen peroxide and an activator (an acyl donor or a chelated transition-metal catalyst), wherein the pH of the composition is adjusted to be within an appropriate range for the type of activator. According to this method, the viscous treating fluid is introduced into subterranean zone and the breaker is allowed to break the viscous treating fluid into thin fluid of reduced viscosity. Then the treating fluid is recovered from the subterranean zone.

A composition and method of the present embodiment provides a means of treating the subterranean zone using a water-based treating fluid containing a delayed water-soluble polymer breaker. Water-based viscous treating fluids comprise (i) water, (ii) a viscosity increasing polymer, (iii) a delayed polymer breaker comprising a source of hydrogen peroxide and an activator (an acyl donor or a chelated transition-metal catalyst), wherein the pH of the composition is adjusted to be within an appropriate range for the type of activator. The viscous treating fluid is introduced into subterranean zone and the breaker is allowed to break the viscous treating fluid and the filtercake on the wall of the formation. Then the treating fluid is recovered from the subterranean zone.

A composition and method of the present embodiment provides a means of treating the subterranean zone using a viscous water-based treating fluid. A polymer breaker is placed into the formation as a preflush. At some later time the polymer breaker is flowed back across the treating fluid and/or the filtercake thereby breaking the treating fluid and/or the filtercake. The polymer breaker comprises: (i) water, (iii) a delayed polymer breaker comprising a source of hydrogen peroxide and an activator (such as an acyl donor or a chelated transition-metal catalyst), wherein the pH of the composition is adjusted to be within an appropriate range for the type of activator. The viscous treating fluid comprises (i) water; (iii) a viscosity increasing polymer, and (iii) optionally, bridging agents for helping to build a filtercake.

A composition and method of the present embodiment provides a means of treating the subterranean zone using a viscous water-based treating fluid. A polymer breaker is placed into the formation as an afterflush (external breaker treatment). The viscous treating fluid comprises: (i) water; (iii) a viscosity increasing polymer, and (iii) optionally, bridging agents for helping to build a filtercake. The polymer breaker comprises: (i) water, (iii) delayed polymer breaker comprising a mixture of hydrogen peroxide source, an activator (an acyl donor or a chelated transition-metal catalyst), wherein the pH of the composition is adjusted to be within an appropriate range for the type of activator. The breaker solution is pumped into the formation as an afterflush. Sufficient contact time is given to allow the breaker to reduce the viscosity of the viscous treating fluid. Thereafter the treating fluid is recovered from the subterranean zone.

According to a presently most-preferred embodiment, a composition and method provides a means of treating the subterranean zone using a water-based treating fluid containing a delayed water-soluble polymer breaker (for gravel packs, fracturing, frac packs, fluid loss pills, drilling or drill-in fluids, etc.). According to this embodiment, a water-based viscous treating fluid comprises (i) water, (ii) Xanthan polymer, (iii) delayed polymer breaker comprising a mixture of sodium perborate and an alkanoyl-donor activator (ethyl acetoacetate), (iv) and a buffer selected to help maintain the pH of the composition in any range within a preferred range of between 5 and 8. The viscous treating fluid composition is introduced into a low temperature (less than 100° F./38° C.) subterranean zone and the breaker is allowed to break the viscous treating fluid into thin fluid of reduced viscosity. Then the treating fluid is recovered from the subterranean zone.

According to another presently most-preferred embodiment, a composition and method provides a means of treating the subterranean zone using a water-based treating fluid containing a delayed water-soluble polymer breaker (for gravel packs, fracturing, frac packs, fluid loss pills, drilling or drill-in fluids, etc.). Water-based viscous treating fluids comprise (i) water, (ii) Xanthan polymer, (iii) delayed polymer breaker comprising a mixture of sodium perborate and an activator (chelated transition-metal ions such as copper-EDTA, Fe-citrate, Mn(III)-gluconate, Fe-Tetraamidomacrocyclic ligand ("Fe-TAML"), etc.), (iv) and a buffer selected to help maintain the pH in any range within a range of between 3 to 10. The viscous treating fluid composition is introduced into a low temperature (less than 100° F./38° C.) subterranean zone and the breaker is allowed to break the viscous treating fluid into thin fluid of reduced viscosity. Then the treating fluid is recovered from the subterranean zone.

An advantage of the compositions and methods according to the invention is the ability to break a viscosity increasing polymer in a controlled manner, i.e., the rate of degradation of the polymer is not immediate and can be relatively slow at low temperature without other adverse effects. The rate of degradation of the fluid can be controlled by the concentration of oxidizer, amount of chelant or complex forming ligand in the transition-metal activators, and the amount of acyl-donor activator. For effective polymer breakage, the pH of the medium needs to be controlled.

The water used in the compositions and methods according to the invention can be freshwater, but preferably a brine. The brine can be natural brine, such as brackish water or seawater. The brine can also be synthetic, made by adding water-soluble salt to freshwater. The water, whether freshwater, a natural brine, or a synthetic brine, can have added water-soluble salt, which can be for example, to weight the treatment fluid, i.e., increase the density. If an added water-soluble salt is included, preferably, the added salt is selected from the group consisting of sodium chloride, potassium chloride, sodium bromide, calcium bromide, zinc bromide, sodium formate, and any combination thereof in any proportion.

Various viscosity increasing polymers can be used to build viscosity in water-based fluids. In sufficient concentration, many of these viscosity increasing polymers can build a gelled fluid. To build a gelled fluid, such viscosity increasing polymers generally present in the viscous fluid compositions in an amount in the range of from about 0.25% to about 1.5% by weight of the water in the compositions. Most viscosity increasing polymers employed in the oil and gas industry are biopolymers. Typical viscosity increasing polymers include polysaccharides such as guar, guar derivatives, cellulose, starch, xanthan, etc. Several of these, such as xanthan, scleroglucan, diutan, cellulose derivatives, etc. can be commercially obtained relatively clean compared to guar gum.

Xanthan gum polymers are proposed as an alternative to succinoglycan, which is being used in low-temperature gravel pack/frac pack applications.

The source of hydrogen peroxide is preferably selected from the group consisting of inorganic persalts, alkali metal peroxides (e.g. sodium peroxide), organic peroxide (e.g. urea-hydrogen peroxide), and hydrogen peroxide, and any combination thereof in any proportion. Persalts include, for example and without limitation, alkali perborates, percarbonates, perphosphates, with more specific examples including, without limitation, sodium perborate monohydrate, sodium perborate tetrahydrate, sodium percarbonate, sodium pyrophosphate peroxyhydrate, etc.

In the compositions and methods according to the invention, the alkanoyl-donor compound is preferably selected from the group consisting of: ethyl acetate, ethyl acetoacetate; tetracetylethylenediamine ("TAED"); sodium nonanoyloxybenzenesulfonate ("NOBS"); and any combination thereof in any proportion. Preferably, the alkanoyl-donor compound is present in a concentration of at least 0.5% by weight.

In the compositions and methods according to the invention, the transition metal is preferably selected from the group consisting of: copper, cobalt, manganese, iron, and any combination thereof in any proportion. The chelating agent preferably comprises: EDTA, alkali or alkaline metal salt of EDTA, alkali metal citrate, citric acid, iminodiacetic acid, gluconate, NTA, tetraamidomacrocyclic ligand, and any combination thereof in any proportion. The chelated transition metal is preferably selected from the group consisting of: as copper-EDTA, Fe-citrate, Mn(III)-gluconate, Fe-Tetraamidomacrocyclic ligand, and any combaintion thereof in any proportion.

Preferably, in the compositions and methods according to the invention, the composition further comprises: a chelating agent for iron or other dissolved transition-metal ions. The chelating agent is preferably selected from the group consisting of citric acid, sodium citrate, EDTA, iminodiacetic acid, NTA, etc.

Preferably, in the compositions and methods according to the invention, the compositions further comprise: a pH adjusting compound for adjusting the pH of the composition. The pH adjusting compound can comprise: a buffer, an acid, or a base.

In the compositions and methods according to the invention, compositions preferably further comprise: a chelating agent for iron or other dissolved transition-metal ions. The chelating agent is selected from the group consisting of citric acid, sodium citrate, EDTA, iminodiacetic acid, NTA, etc.

In working on the invention, it was determined that bleach (5-6% sodium hypochlorite) would break a Xanthan gel with a gel loading of 42 lb/Mgal (5 g/L) when mixed in water (a brine) at 131° F. (55° C.), but the break time was very fast and would be difficult to control for well treatment applications. Bleach broke the gel at 95° F. (35° C.) in a reasonable time for well treatment applications. However, the pH of bleach is high, typically in the range of about 10 to about 12. Even though bleach can be effective in breaking a gel based on a xanthan gum polymer at very low temperatures, bleach may be considered to be too corrosive and undesirable to use in some wellbore applications.

Sodium perborate was tested as a breaker for a xanthan gel with a gel loading of 42 lb/Mgal (5 g/L) of the water (brine) at 131° F. (55° C.), and it was determined that the break time was reasonable for well treatment applications. But when tested at 95° F. (35° C.), sodium perborate could not break the gel, even with loadings up to 1,000 lb/Mgal (120 g/L).

Sodium perborate and ethyl acetoacetate ("EAA") has been reported as being capable of breaking a gel of a typical xanthan gum polymer ("XANVIS") down to 80° F. (27° C.). See Kelco Oilfield Group in its Technical Bulletin entitled "Breaker Applications," revised 01/04. The breaker recipe provided by Kelco is only effective in monovalent brines. It is not effective in divalent brines such as a $CaCl_2$ brine. Also, if the pH of the recipe is not controlled in monovalent brines then it does not break the polymer completely to a water thin consistency to flow it back. Controlling of pH is also necessary in $CaCl_2$ brines.

The method was tried using the published recipe for breaking a xanthan gel, however, we were unable to break the gel using the published recipe. We tested the recipe of the Kelco bulletin tested as follows: Viscosity readings were taken on a $\frac{1}{5}^{th}$ spring Fann 35 Viscometer. The readings need to be divided by 5 to be equivalent to a Fann 35 300 RPM reading with a #1 bob and sleeve. Added 1,000 mL of Duncan Tap Water (i.e., tap water from Duncan, Okla.) to a Waring Blender. The pH of the Duncan Tap Water was 7.77. After the addition of the xanthan (5.76 grams/Liter) the pH was 7.83. Allowed the gel to hydrate for 1 hour. Added 2 grams/Liter of sodium perborate tetrahydrate to the hydrated gel. The pH after the addition of the sodium perborate was 10.0. Added 0.7 mL of ethyl acetoacetate. The pH decreased to 9.8. The viscosity of the gel with additives was 31.2 cp (dial reading of 156 at 300 RPM with a ⅕th spring). After about 1 hour, the viscosity was 24.6 cp (dial reading of 123 at 300 RPM with a ⅕th spring). The pH was 9.2. After about 2 hours, the viscosity was 23 cp (dial reading of 115 at 300 RPM with a ⅕th spring). The pH was 9.34. After about 16 hours, the viscosity had fallen to 17.6 cp (dial Reading of 88 at 300 RPM with a ⅕th spring). The pH was 8.49. The gel sample was dumped at this point. Thus, the pH of the tested Kelco recipe was about 10, and remained high throughout the test.

With further work with sodium perborate and ethyl acetoacetate, it was determined that if the pH is too high of a pH (i.e., greater than about 8) or too low of a pH (i.e., less than about 5) in the result is incomplete breakage of the polymer. In some cases a high pH also leads to crosslinking of the xanthan by borate ions when using a sodium perborate breaker. It was determined that for optimum breakage, the control of pH is critical. The effect of pH is not taken into consideration in the Kelco bulletin.

It is also believed that transition-metal impurities (iron, copper, manganese, etc.) also play a crucial role in the breakage of xanthan by sodium perborate. These transition metals can catalyze perborate to give unreliable and uncontrolled break. The effect of such transition-metal impurities are not taken into consideration in Kelco bulletin.

The concentration of sodium perborate was increased from 24 lb/Mgal (1 lb/bbl or 2.9 g/L) to 100 lb/Mgal (12 g/L) and the concentration of ethyl acetoacetate was increased from 6 gal/Mgal (0.25 gal/bbl or 6 mL/L) to 10 gal/Mgal (10 mL/L). This resulted in a decrease in the viscosity of the gel to about 3 cP over a 24 hour period. However, some unusual spikes (increases) were observed in the viscosity profile accompanied by changes in the trend of the pH (increasing).

Sodium phosphate or potassium phosphate was added to adjust the pH to 6.5. This helped break the xanthan gel in much less time than 24 hours. The gel broke more cleanly and the viscosity decreased to less than 2 cP, and the addition of the base smoothed out the spikes in the viscosity profile as the gel broke.

Experiments were performed with various combinations of sodium perborate, ethyl acetoacetate, and sodium or potassium phosphate buffer. Experiments were also performed with other bases and buffers to control the pH with some success. These include ammonium acetate, TRIS, etc.

Experiments were performed with various monovalent and divalent brines such as seawater plus potassium chloride, potassium chloride and calcium chloride. When calcium chloride is present there is a concern about potential precipitation problems when using phosphate buffers. When using calcium chloride as the base brine for the viscous treating fluid it was found that sodium perborate and chelated transition-metal activators such as copper-EDTA and iron citrate broke the gel in a reasonable time. The amount of the chelating agent in this system will determine the delay in the time of break. The best viscosity breaks occurred when the pH was in the range of 5 to 8. Experiments were also performed with citric acid in place of potassium phosphate out of a concern that there might be a precipitation or scale problem with using potassium phosphate. When using citric acid, the pH was varied from 7 down to 4 in increments of 1 unit pH. In the examples using citric acid, at a pH of 7 or 6, the gel broke in a timely fashion, but in the examples at lower pH, the rate of break slowed down.

Without being limited by any theoretical explanation, it is believed that pH plays a role in accelerating the breakdown of the polymer. It may be possible, however, that there is a chemical reaction or other mechanism at work between the potassium phosphate, sodium perborate, and/or ethyl acetoacetate ("EAA") that is accelerating the break of the xanthan gum or other viscosifying agents.

It is presently believed that the most likely break mechanism when using sodium perborate, ethyl acetoacetate, and monosodium phosphate to break xanthan at 95° F. (35° C.) is that the ethyl acetoacetate is converted by sodium perborate to its peracid, which is a much stronger oxidizing acid than hydrogen peroxide. It is believed it should be possible to use other acetyl precursors such as tetraacetylethylenediamine ("TAED") and sodium nonanoyloxybenzenesulfonate ("NOBS"). It is presently believed that an essential feature of for these activators is the presence of a good leaving group (pKa~6-13). The addition of these acetyl precursors lowers the temperature use of perborate in the breakage of saccharides.

The information in the Kelco Technical Bulletin for Xanthan breakers was used as a starting point. That bulletin indicated that the combination of sodium perborate and ethyl acetoacetate would allow one to break a xanthan gel at temperatures as low as 80° F. (27° C.). The recipe did not appear to work. The amounts of sodium perborate and ethyl acetoacetate were increased by quite a bit and some significant reduction in viscosity were observed. Experiments were performed to optimize the breaker composition. It was found that the sodium perborate would raise the pH of the base gel once it was added in significant quantities. As the viscosity began to go down the pH would also go down. In some cases a slight increase in pH combined with an increase in the viscosity near the end of the break tests was observed. Several tests were performed to determine the mechanism by which this occurred and crosslinking of the gel was observed as the pH began to rise. Without being limited by any particular theoretical explanation, it is believed that the crosslinking was due to the borate material in the sodium perborate.

Experiments were performed using potassium phosphate to buffer the pH of the gel in the 6-7 range to increase the efficiency of the break. That also had the added benefit of reducing any potential for corrosion. Experiments were performed using potassium phosphate in combination with sodium perborate and ethyl acetoacetate. The combination of xanthan, citric acid, sodium perborate, ethyl acetoacetate and potassium (or sodium) phosphate significantly reduced the time to break the gel. The citric acid was used to chelate excess free iron and other transition-metal ions in the fluid to minimize problems in attaining viscosity, prevent cros slinking of the gel, and control the pH so that a desirable delay in break could be achieved.

Experiments were performed to optimize the concentrations of that combination. Depending upon the brine it was found that the combination was most effective when using 25 parts sodium perborate to 1 part ethyl acetoacetate. In other cases the combination was more effective using 10 parts sodium perborate and 1 part ethyl acetoacetate.

This invention relates to breaking xanthan as well as other polymers such as guar gum, hydroxypropyl guar ("HPG"), carboxymethyl guar ("CMG"), carboxymethylhydroxypropyl guar ("CMHPG"), diutan, polyacrylamides, starch, cellulose, hydroxyethyl cellulose ("HEC"), carboxymethyl cellulose ("CMC"), etc. at low temperatures and under other challenging conditions. Applications for this new technology can include gelled fluid breaker, frac fluid breaker, gravel pack fluid breaker, drill-in fluid wall cake clean-up treatments, fluid loss pill breaker and clean-up pills. The breaker system can be applied as an internal breaker, as a preflush "poision" pill, or as an external afterflush breaker.

Sodium perborate is a highly effective oxidative agent and is used mostly in laundry washing and bleaching as well as in oilfield applications such as breaking polymers. Sodium perborate is commercially available as the tetrahydrate ($NaBO_3 \cdot 4H_2O$) form or the monohydrate ($NaBO_3 \cdot H_2O$) form. The monohydrate form of sodium perborate dissolves faster than the tetrahydrate at lower temperatures. They contain true peroxygen bonds, unlike, for instance sodium percarbonate or sodium perphosphate. In crystalline form, Sodium perborate exists as a dimeric cyclic peroxodiborate salt which in aqueous media rapidly hydrolyzes to form an equilibrium solution of hydrogen peroxide, tetrahydroxy borate anions, and one or more peroxyborate species. The equilibrium constant of sodium perborate determines the hydrolysis, implying that in practice sodium perborate can be regarded as solid stable source of hydrogen peroxide.

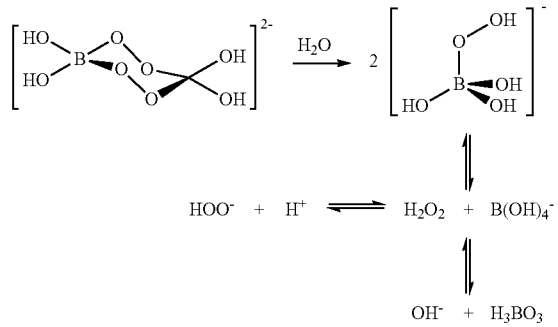

Peroxoborate species such as $(HO)_3BOOH^-$ in which peroxo group remain coordinated to boron are stable in solution. Peroxoborate may be better oxidizing agent than hydrogen peroxide itself. The electrophilic nature of the peroxygen groups is increased by coordination to the boron center. So sodium peroxoborate can be a superior oxidizing agent to hydrogen peroxide at equivalent, high temperature.

The exact mechanism of oxidation by available oxygen from sodium perborate is a subject of conjecture. The perhydroxy anion ($HOO^-$) is believed to be an important, perhaps the most important, oxidizing species. However other including peroxyborates and singlet oxygen, may also be involved. Recent work has indicated that the superoxide radical, $O_2^-$, might act as the active species in some circumstances.

Many oxidation activators have been described that react in situ with hydrogen peroxide to generate peracids, which contain more reactive form of available oxygen for oxidation.

Most activators are acyl donors, generally attached to a phenol or secondary/tertiary nitrogen source since the resultant compounds are less stable in alkaline solution than simple alcohol esters. The simple alcohol esters are important for slow breakage of Xanthan or other hydraulic fracturing polymers, whereas for faster break ester of phenol or secondary/tertiary nitrogen are more useful.

The acyl donors react with the perhydroxy anion generated by sodium perborate in water to form peracids and peracyl anions. An essential feature of the activators is the presence of a good leaving group (pKa ~6-13). Activators such as ethyl acetoacetate (EAA), tetraacetylethylenediamine (TAED), sodium nonanoyloxybenzenesulfonate are some of the examples of acyl donors useful for the preparation of peracid by reaction with sodium perborate.

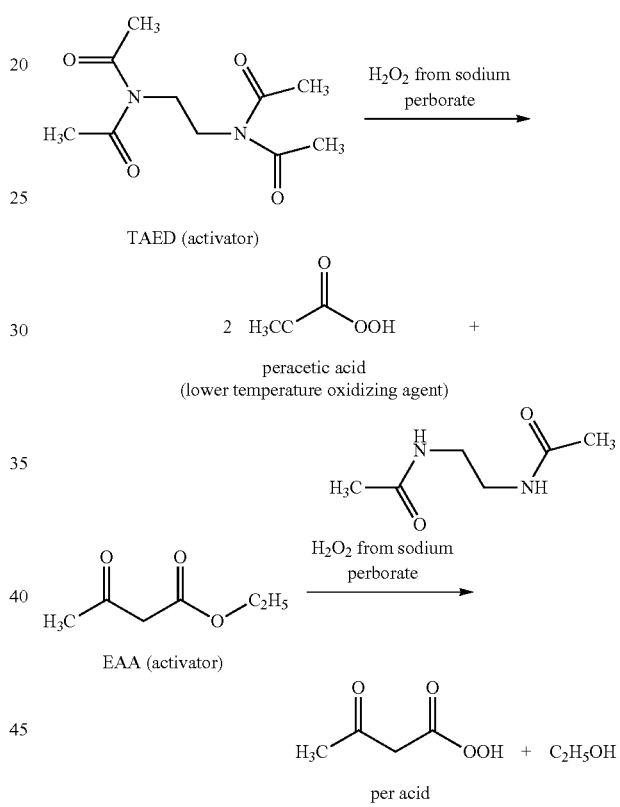

These activators on reaction with sodium perborate generate peracid at lower temperature, a powerful oxidizing agent which works at lower temperature (<60° C.) due to the enhanced kinetics of peracid in comparison to hydrogen peroxide. The oxidation at lower temperature can be enhanced further by maximizing the heterolysis of the peroxidic bond.

The ratio of perborate to activator is important. The rate of peracid generation is enhanced by a higher peroxide-to-activator ratio. Higher pH and higher temperature also favors higher peracid generation. However oxidation and breakage of polysaccharides by peracid is more effective at a lower pH (6.5-8). During oxidation the pH of medium is lowered due to the formation of acid by the decomposition of peracid and also by the oxidation of polysaccharide to molecules containing carboxylic acid groups. This lowering of pH below 6.5 slows down the rate of decomposition of hydrogen peroxide at low temperatures and the generation of peracid and ultimately the rate of breakage of polymer. It is therefore necessary to keep the pH in the optimum range for obtaining an effective break and one way of doing is to use a buffer. If the pH is too high then rate of generation of peracid is too quick and the breaker is spent quickly without completely oxidizing the polysaccharide.

Other mechanisms of oxidation may be in play. The reaction of peracid with its anion, promoted at a pH equal to the pKa of the peracid, may lead to the formation of active oxygen species. It has been speculated that singlet oxygen is responsible for the observed oxidation with sodium perborate/activator system.

Activated perborate is slow to react at ambient temperature, but given a long enough time, it is able to break the xanthan polymer.

These acyl donors can also be used in combination with other peroxide sources such as percarbonate to oxidize natural polymers like xanthan and it works below 104° F. (40° C.). The acyl donor can also be used in combination with sodium pyrophosphate peroxyhydrate, ureaperoxy hydrate, alkali metal peroxides (e.g., sodium peroxide), and any mixture thereof of in any proportion.

The acyl donor or the activator of the present invention have the general formula R—C(=O)-L, where R is an alkyl group and L is a leaving group, the conjugate acid of which has a PKa in the range from 6 to 13, and most preferably in the range from 6 to 10. L can be selected from group —O—Ar,

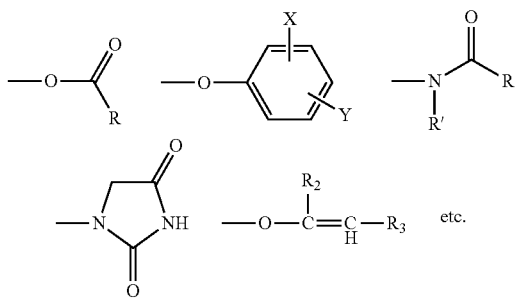

R, R', R2, R3, X, Y=Can be alkyl, H, solubilizing group —SO3M, COOM, quarternary ammonium etc.

Such acyl donors are described in the U.S. Pat. No. 4,412,934 which is hereby incorporated by reference in its entirety.

Activators such as EAA, TAED, etc. effectively increase the reactivity of available oxygen from sodium perborate for oxidation. But these sodium perborate activated systems take a longer time to oxidize/break xanthan or other natural polymers used in fracturing fluids well below 104° F. (40° C.). Another approach to enhance the oxidation potential of sodium perborate is to use a chelated transition-metal ion. Chelated transition-metal ions catalyze peroxy reactions to promote the formation of reactive peroxy or oxo derivatives at lower temperatures. These chelated transition-metal catalyst/activators work in a completely different way to enhance oxidation and are not used up in the chemical reactions like the acyl donors do. So there is less metal ion usage in the reaction and less cost with greater economy of chemical usage. Some of the transition metals like manganese, iron, copper and cobalt form complexes that enhance the perborate oxidation properties at lower temperature. The transition-metal ions should be sufficiently chelated to obtain the required delayed break of the polymer and should not unduly permute peroxide decomposition by non oxidative pathway and should be hydrolytically and oxidatively stable.

In aqueous formulation the perborate suffers from loss of available oxygen. The catalytic breakdown of available oxygen by trace metal ions, particularly copper, iron and manganese, is considered to be the route for this loss. To prevent this oxygen loss powerful sequestering agents are used which complex with these metals. This slows down the reaction. The most effective metal sequestering/chelating agent is sodium phosphate, sodium diphenylaminesulfonate (DPAS), citric acid, EDTA, NTA and the like.

Perborate exists mainly in two forms, i.e. mono and tetrahydrate. Their respective dissolution rate varies with temperature. Mono hydrate is more soluble at low temperature in comparison to tetrahydrate. Therefore, monohydrate can be used at lower temperature for oxidation purpose to attain quick breakage of Xanthan polymer due to increased concentration of oxidizer in comparison to tetrahydrate, which will eventually lead to faster generation of oxidation species. Mixture of both the form of sodium perborate can also be used to tailor the oxidation profile (concentration vs. time) at particular temperature.

Other means to alter the concentration or solubility of sodium perborate in solution is to use polyhydroxycarboxylates capable of forming complexes with perborate. Enhancing solubility at low temperature also helps the enhanced oxidation by increasing the concentration of oxidizer in the solution.

Solubility of perborates can also be increased by addition of borates or other co solutes. But in our case the borates can interfere in the process by crosslinking the polysaccharides.

The preceding theoretical discussion should not be considered to be a complete description of the potential break mechanisms and was prepared in a preliminary form.

According to the invention, a composition for breaking a viscosity increasing polymer, the composition comprising (i) water and (ii) a delayed polymer breaker comprising a source of hydrogen peroxide and an activator (an acyl donor or a chelated transition-metal catalyst), wherein the pH of the composition is adjusted to be within an appropriate range for the type of activator. The multi-component breaker composition can be used to break viscosity increasing polymers at very low temperatures. The multi-component breaker composition according to the invention provides additional parameters for control by changing the concentration and relative ratios of the different components.

Generally, to break a polymer such as xanthan gum requires the generation of a certain number of cleavages in the polymer backbone or polymer branches so as to break the polymer and cause the desired reduction in viscosity. Accordingly, the concentration of oxidizer needed to break the xanthan gum in a xanthan gum solution can be determined based on the amount of xanthan gum in the solution.

At more typical temperatures, above 100° F. (38° C.) and higher, for example, to obtain a delayed break of the polymer or a slow rate of break down of the polymer with a strong oxidizer would require a reduction of the concentration of the oxidizer. However, there is a limit to the degree to which the concentration of the oxidizer can be reduced because, as noted above, there are a certain number of cleavages in the polymer backbone that are necessary to achieve the desired reduction in viscosity.

At very low temperatures, however, below 100° F. (38° C.), weaker oxidizers than bleach may not work. Therefore, especially at very low temperatures, to achieve a delayed polymer breaker system, a control mechanism other than the concentration of oxidizer alone is necessary.

Such control is provided by the buffer and activator of the compositions of the present embodiment. According to the breaker compositions of the present embodiment, delayed polymer breaks are accomplished, not by adjusting the concentration of the peroxide generating oxidizer alone, but by changes to the concentrations of the other components of the breaker composition.

It will be understood that if a strong oxidizer is added to a viscous gel, it would fairly quickly reduce the viscosity and would not result in a delayed break of the gel. Instead according to the breaker compositions of the present embodiment, a weaker oxidizer (a peroxide generating oxidizer) is used that is not capable of breaking the xanthan polymer on its own and the peroxide is slowly activated to a strong oxidizer. According to the breaker compositions of the present embodiment, the activator in combination with peroxide generating oxidizer generates a stronger oxidizer. In addition, the combination of a chelated transition-metal ion in combination with a peroxide source will generate free radicals which can break the polymer.

In such a system, however, at neutral pH for example, ferric iron will precipitate from solution as iron hydroxide. So, to prevent such precipitation, an iron chelating agent, such as citrate anion, is preferably added to complex with any ferrous ion in the water or that the breaker composition encounters in use downhole. However, the citrate anion tends to interfere with the generation of the peroxide radical. Therefore, the more citrate that is added, the more interference is caused and the slower the generation of the stronger oxidizer. Consequently, the citrate anion can participate in the control of the break rate according to the preferred compositions of the present embodiment. If a relatively high concentration of citric acid is used in place of the phosphate, however, this system can work.

According to another aspect of the invention, a method of treating a portion of a subterranean formation is provided, the method comprising the steps of: (A) introducing a treatment composition according to the invention into the subterranean formation; and (B) after introducing the treatment composition, flowing back fluids from the subterranean formation. Preferably, the treatment composition further comprises an iron chelating agent.

The water used in the treatment fluids according to the invention can be freshwater, but preferably a brine. The brine can be natural brine, such as brackish water or seawater. The brine can also be synthetic, made by adding water-soluble salt to freshwater. The water, whether freshwater, a natural brine, or a synthetic brine, can have added water-soluble salt, which can be for example, to weight the treatment fluid, i.e., increase the density. Preferably, the added salt is selected from the group consisting of sodium chloride, potassium chloride, sodium bromide, calcium bromide, zinc bromide, sodium formate, and any combination thereof in any proportion. In general, the added salt is selected based on its ability to dissolve in and weight an aqueous fluid and based on its cost as well as being non-damaging to the formation. Preferably, the added salt is present in at least 1% by weight of the water.

Preferably, a treatment composition according to the present invention further comprises: a chelating agent for iron. The purpose of the chelating agent is to bind iron and prevent undesirable crosslinking of the xanthan gum polymer, which would undesirably increase the viscosity of the gelled fluid. The chelating agent can be selected, for example, from the group consisting of: citric acid, a citrate salt, and any combination thereof in any proportion. Controlling complexing-metal ions, such as iron, manganese, copper, etc., is also important as such ions can catalyze the oxidation of hydrogen peroxide or perborate at low temperature and break the polymer too quickly.

When a viscous treating fluid composition is utilized in accordance with this embodiment, various viscosity increasing polymers can be included in the treating fluid composition. A preferred group of viscosity increasing polymers include biopolymers such as xanthan, diutan, and succinoglycan gums.

The water and xanthan gum polymer forms a viscosified fluid, sometimes referred to as a "base fluid" having an apparent viscosity greater than about 10 cP, and preferably in the range of about 10 cP to about 50 cP. Preferably the xanthan gum polymer is present in at least 0.25% by weight of the water (20 lb/Mgal) in the treatment composition, and more preferably in the range of about 0.25% by weight of the water (20 lb/Mgal) to about 1% by weight of the water (80 lb/Mgal).

Preferably, the buffer is selected from the group consisting of: phosphate, carboxylic acid, or salt of a carboxylic acid. More preferably, the buffer comprises a phosphate. According to the presently most preferred embodiment of the invention, the buffer comprises sodium or potassium phosphate. Preferably, the buffer is present in an effective amount to buffer the treatment composition during the breaking of the fluid. Preferably, the buffer is present in at least about 0.5% by weight of the water (40 lb/Mgal), and more preferably, the buffer is present in the range of about 0.5% by weight of the water (40 lb/Mgal) to about 3% by weight of the water (250 lb/Mgal) in the treatment composition.

Without being limited by any theoretical explanation, it is believed that having a buffer is particularly important when using a perborate oxidizer, which otherwise might cause undesirable crosslinking and spikes (increases) in the viscosity of the base gel fluid.

The breaker is preferably selected to avoid excessive corrosion concerns or problems. Thus, bleach is preferably avoided as breaker. Suitable breakers include compounds which are capable of yielding hydrogen peroxide in the solution. These compounds are well known in the art and include hydrogen peroxide and alkali metal peroxides (e.g., sodium peroxide), organic peroxide compound such as urea-hydrogen peroxide, and inorganic persalts such as alkali perborates, percarbonates, perphosphates and the like. Mixture of two or more such compounds can be used, if desired. Preferably, the oxidizer is selected from the group consisting of: sodium perborates commercially available in mono- and tetrahydrate, sodium percarbonate, sodium pyrophosphate peroxyhydrate, urea peroxyhydrate, and sodium peroxide, and any combination thereof in any proportion. More preferably, the oxidizer comprises a sodium perborate comprising sodium perborate tetrahydrate or sodium perborate monohydrate. For easy dissolution at very low temperature monohydrate of sodium perborate is preferred.

The oxidizer is present in a sufficient concentration in the treatment composition to wherein the oxidizer is in a sufficient concentration in the treatment composition to substantially break the viscosity of the viscosified fluid formed by the water and xanthan gum polymer. For example, the oxidizer is preferably present in at least about 0.6% by weight (50 lb/Mgal) of the water, and more preferably in the range of about 0.6% by weight (50 lb/Mgal) to about 3% by weight (250 lb/Mgal) of the water of the treatment composition, although much greater concentrations can be used.

According to one aspect of the invention, the activator for the oxidizer is a water-soluble alkanoyl-compound that has a good leaving group with a pKa in the range of about 6 to about 13 and most preferably in the range from about 6 to about 10. The activator can be an ester, acyl alkyl phenols, acyl amides, acyl alkyl phenol sulfonate, acyl phenol sulfonate, etc.

Preferably, the alkanoyl-donor compound is selected from the group consisting of: ethyl acetoacetate; tetracetylethylenediamine ("TAED"); sodium nonanoyloxybenzenesulfonate ("NOBS"); and any combination thereof in any proportion. More preferably, the alkanoyl is an ethanoyl ("acetyl"). More preferably still, the alkanoyl-donor compound is an acetoacetate. According to a presently most preferred embodiment of the invention, the acetoacetate is an acetoacetate ester. Most preferably, the acetoacetate ester is ethyl acetoacetate. For faster breakage the TEAD types of acyl donors can be used and for longer break time acyl donor of aliphatic alcohols such as ethyl acetoacetate can be used.

The treatment fluid according to the invention is preferably injected at a temperature of less than 150° F. (65° C.). This temperature range is within the normal ambient temperature range at the wellhead and avoids any need for heating the treatment fluid. The treatment fluid has particular application when injected at a temperature below 100° F. (38° C.).

The treatment fluids and methods according to the invention have particular application at lower temperatures, such as where the static temperature of the subterranean formation is less than 200° F. (93° C.). The treatment fluids and methods according to the invention are especially useful at very low temperatures, at which xanthan gelled fluids are more difficult to break, such as where the static temperature of the subterranean formation is less than 100° F. (38° C.).

The treatment fluid can further comprise sand, gravel, resin-coated proppant, or synthetic proppant, for example if the treatment fluid is to be used in a hydraulic fracturing or gravel packing operation.

The method preferably further comprises the step of forming the treatment composition, most preferably near the well head, and injecting the treatment composition into the subterranean formation. According to certain embodiments, the method further includes injecting other, separate types of treatment fluids, either before or after a treatment fluid according to the present invention, or co-mingled with a treatment fluid according to the present invention.

According to another embodiment of the invention, the step of introducing the treatment composition comprises the steps of: (A) introducing a base gel fluid comprising: (i) water; (ii) a viscosity increasing polymer; and (iii) the buffer; and (B) separately introducing a breaking fluid comprising: either one of the oxidizer and the activator; wherein the other one of the oxidizer and the activator is in either the base gel fluid or the breaking fluid whereby the breaking fluid mixes with the base gel fluid in the subterranean formation. According to this embodiment, preferably the breaking fluid comprises both the oxidizer and the activator. Preferably, the breaker fluid is introduced into the subterranean formation after introducing the base gel fluid. The breaker fluid can be introduced as an overflush or using a "poison pill" technique.

For example, a method of treating a portion of a subterranean formation is provided, the method comprising the steps of: (A) treating the portion of the subterranean formation with a treatment composition comprising: (i) water; (ii) a xanthan gum polymer; and (iii) a buffer to maintain the pH in the range of about 3 to about 8 for an alkanoyl-donor compound as activator or in the range of about 3 to about 10 for a chelated transition metal as activator; and (B) treating the portion of the subterranean forming with a breaker composition comprising: (i) a hydrogen peroxide generating oxidizer; and (ii) an activator for the oxidizer.

According to yet another embodiment, the method of treating a portion of a subterranean formation comprises the steps of: (A) forming a treatment composition comprising: (i) water; (ii) a xanthan gum; and (iii) a buffer to maintain the pH in the range of about 3 to about 8 for a alkanoyl-donor compound as activator or in the range of about 3 to about 10 for a chelated transition metal as activator; and (iv) a hydrogen peroxide generating oxidizer; and (v) an activator for the oxidizer; and (B) introducing the treatment composition through a wellbore and into a portion of the subterranean formation.

Applications for this technology can include gelled fluid breaker, frac fluid breaker, gravel pack fluid breaker, drill-in filtercake clean-up treatments, fluid loss pill breaker and clean up.

EXAMPLE 1

Breaking at 95° F. (35° C.) a 42 lb/Mgal (5 g/L) xanthan gum polymer in 3% KCl water containing 7.8 lb/Mgal (0.94 g/L) citric acid using 100 lb/Mgal (12 g/L) sodium perborate and 10 gal/Mgal (10 ml/L) ethyl acetoacetate.

The reported specific gravity of ethyl acetoacetate is 1.029 and the reported density of ethyl acetoacetate is 8.57 lb/gal.

The procedure was as follows: Add 1 L water to a Waring blender jar; add 30 g KCl (3% by weight of water); add 0.94 g/L (7.8 lb/Mgal) citric acid; add 5.04 g/L (42 lb/Mgal) xanthan gum polymer; allow the gel to hydrate for 30 minutes to 1 hour; measure the pH and viscosity of the gel at the start; add 12 g/L (100 lb/Mgal) sodium perborate and 10 ml/L (10 gal/Mgal) ethyl acetoacetate; after adding the sodium perborate and ethyl acetoacetate, place the test sample in a temperature bath to be maintained at 95° F. (35° C.); measure the pH and viscosity every hour after the start and one to two more times over a period of time.

Viscosity readings were taken on a $\frac{1}{5}^{th}$ spring Fann 35 Viscometer. The readings need to be divided by 5 to be equivalent to a Fann 35 300 RPM reading with a #1 bob and sleeve. The start readings were taken with the base gel at room temperature. All other readings were taken with the test sample placed in a temperature bath at 95° F. (35° C.).

TABLE 1

Break Data for Example 1

| Time (hours) | Dial Reading | Viscosity (cP) | pH |
|---|---|---|---|
| 0 | 141 | 28.2 | 2.3 |
| After Breaker | | | |
| 2.5 | 27 | 5.4 | 8.0 |
| 16.5 | 16 | 3.2 | 7.6 |
| 22.5 | 15 | 3 | 7.6 |
| 24.5 | 15 | 3 | 7.6 |
| 26.5 | 15 | 3 | 7.6 |

EXAMPLE 2

Breaking at 95° F. (35° C.) a 60 lb/Mgal xanthan gum polymer in 3% KCl water containing 7.8 lb/Mgal citric acid using 175 lb/Mgal (21 g/L) sodium perborate, varied concentrations of ethyl acetoacetate, and 229 lb/Mgal (27.5 g/L) potassium phosphate.

The procedure was as follows: Add 1 L water to a Waring blender jar; add 30 g KCl (3% by weight of water); add 0.94 g/L (7.8 lb/Mgal) citric acid; add 7.2 g/L (60 lb/Mgal) xanthan gum polymer; allow the gel to hydrate for 30 minutes to 1 hour; measure the pH and viscosity of the gel at the start; add 12 g/L (100 lb/Mgal) sodium perborate and the varied amount of ethyl acetoacetate at 10 ml/L (10 gal/Mgal), at 12.5 ml/L (12.5 gal/Mgal), at 15 ml/L (15 gal/Mgal), or at 17.5 ml/L (17.5 gal/Mgal); after adding the sodium perborate and ethyl acetoacetate, place the test sample in a temperature bath to be maintained at 95° F. (35° C.); add approximately 27.5 g/L (229 lb/Mgal) potassium phosphate to buffer the pH from about 9 down to 6.6; measure the pH and viscosity every hour after the start and one to two more times over a period of time.

Viscosity readings were taken on a ⅕th spring Fann 35 Viscometer. The readings need to be divided by 5 to be equivalent to a Fann 35 300 RPM reading with a #1 bob and sleeve. The start readings were taken with the base gel at room temperature. All other readings were taken with the test sample placed in a temperature bath at 95° F. (35° C.).

TABLE 2a

Break Data for Example 2 with 10 gal/Mgal Ethyl acetoacetate

| Time (hours) | Dial Reading | Viscosity (cP) | pH |
|---|---|---|---|
| 0 | 218.5 | 43.7 | 3.7 |
| After Breaker | | | |
| 1.75 | 79.5 | 15.9 | 6.5 |
| 3.75 | 18 | 3.6 | 6.4 |
| 6.25 | 10 | 2 | 6.3 |
| 21.5 | 6.5 | 1.3 | 6.2 |

TABLE 2b

Break Data for Example 2 with 12.5 gal/Mgal Ethyl acetoacetate

| Time (hours) | Dial Reading | Viscosity (cP) | pH |
|---|---|---|---|
| 0 | 218.5 | 43.7 | 3.7 |
| After Breaker | | | |
| 1.75 | 84 | 16.8 | 6.5 |
| 3.75 | 19.5 | 3.9 | 6.4 |
| 6.25 | 10.5 | 2.1 | 6.3 |
| 21.5 | 7 | 1.4 | 6.3 |

TABLE 2c

Break Data for Example 2 with 15 gal/Mgal Ethyl acetoacetate

| Time (hours) | Dial Reading | Viscosity (cP) | pH |
|---|---|---|---|
| 0 | 218.5 | 43.7 | 3.7 |
| After Breaker | | | |
| 1.75 | 75 | 15 | 6.5 |
| 3.75 | 17 | 3.4 | 6.4 |
| 6.25 | 9.5 | 1.9 | 6.3 |
| 21.5 | 6.5 | 1.3 | 6.2 |

TABLE 2d

Break Data for Example 2 with 10 gal/Mgal Ethyl acetoacetate

| Time (hours) | Dial Reading | Viscosity (cP) | pH |
|---|---|---|---|
| 0 | 218.5 | 43.7 | 3.7 |
| After Breaker | | | |
| 1.75 | 106 | 21.2 | 6.5 |
| 3.75 | 21 | 4.2 | 6.4 |
| 6.25 | 11 | 2.2 | 6.3 |
| 21.5 | 7.5 | 1.5 | 6.2 |

EXAMPLE 3

Breaking at 95° F. (35° C.) a 60 lb/Mgal xanthan gum polymer in 3% KCl water containing 7.8 lb/Mgal citric acid using 175 lb/Mgal (21 g/L) sodium perborate, 10 gal/Mgal (10 ml/L) ethyl acetoacetate, and varied concentrations of potassium phosphate. The procedure for Example 3 was similar to that used in Example 2.

TABLE 3a

Break Data for Example 3 with 50 lb/Mgal Potassium Phosphate

| Time (hours) | Dial Reading | Viscosity (cP) | pH |
|---|---|---|---|
| 0 | 214.5 | 42.9 | 3.9 |
| After breaker | | | 8.4 |
| 3.25 | 17.5 | 3.5 | 7.5 |
| 5 | 14 | 2.8 | 7.4 |
| 20.5 | 9 | 1.8 | 7.2 |

TABLE 3b

Break Data for Example 3 with 100 lb/Mgal Potassium Phosphate

| Time (hours) | Dial Reading | Viscosity (cP) | pH |
|---|---|---|---|
| 0 | 214.5 | 42.9 | 3.9 |
| After breaker | | | 7.8 |
| 3.25 | 16.5 | 3.3 | 7.1 |
| 5 | 10.5 | 2.1 | 6.9 |
| 20.5 | 7 | 1.4 | 6.8 |

TABLE 3c

Break Data for Example 3 with 200 lb/Mgal Potassium Phosphate

| Time (hours) | Dial Reading | Viscosity (cP) | pH |
|---|---|---|---|
| 0 | 214.5 | 42.95 | 3.9 |
| After breaker | | | 6.9 |
| 3.25 | 20 | 4 | 6.6 |
| 5 | 10.5 | 2.1 | 6.5 |
| 20.5 | 6 | 1.2 | 6.4 |

TABLE 3d

Break Data for Example 3 with 225 lb/Mgal Potassium Phosphate

| Time (hours) | Dial Reading | Viscosity (cP) | pH |
|---|---|---|---|
| 0 | 214.5 | 42.9 | 3.9 |
| After breaker | | | 6.8 |
| 3.25 | 26 | 5.2 | 6.6 |
| 5 | 11.5 | 2.3 | 6.5 |
| 20.5 | 6.5 | 1.3 | 6.4 |

EXAMPLE 4

Breaking at 95° F. (35° C.) a 60 lb/Mgal xanthan gum polymer in 3% KCl water containing 7.8 lb/Mgal citric acid using varied concentrations of sodium perborate, 10 gal/Mgal (10 ml/L) ethyl acetoacetate, and 229 lb/Mgal (27.5 g/L) potassium phosphate. The procedure for Example 4 was similar to that used in Example 2.

TABLE 4a

Break Data for Example 4 with 100 lb/Mgal Sodium Perborate

| Time (hours) | Dial Reading | Viscosity (cP) | pH |
|---|---|---|---|
| 0 | 214.5 | 42.9 | 3.9 |
| After breaker | | | 6.2 |
| 1 | 188.5 | 37.7 | 6.2 |

TABLE 4a-continued

Break Data for Example 4 with 100 lb/Mgal Sodium Perborate

| Time (hours) | Dial Reading | Viscosity (cP) | pH |
|---|---|---|---|
| 2 | 171 | 34.2 | 6.1 |
| 5.5 | 11 | 2.2 | 6.1 |
| 24 | 9 | 1.8 | 6.1 |

TABLE 4b

Break Data for Example 4 with 125 lb/Mgal Sodium Perborate

| Time (hours) | Dial Reading | Viscosity (cP) | pH |
|---|---|---|---|
| 0 | 214.5 | 42.9 | 3.9 |
| After breaker | | | 6.5 |
| 1 | 182 | 36.4 | 6.3 |
| 2 | 134 | 26.8 | 6.3 |
| 5.5 | 7.5 | 1.5 | 6.2 |

TABLE 4c

Break Data for Example 4 with 150 lb/Mgal Sodium Perborate

| Time (hours) | Dial Reading | Viscosity (cP) | pH |
|---|---|---|---|
| 0 | 214.5 | 42.9 | 3.9 |
| After breaker | | | 6.6 |
| 1 | 200 | 40 | 6.5 |
| 2 | 113 | 22.6 | 6.4 |
| 5.5 | 7 | 1.4 | 6.3 |

TABLE 4d

Break Data for Example 4 with 175 lb/Mgal Sodium Perborate

| Time (hours) | Dial Reading | Viscosity (cP) | pH |
|---|---|---|---|
| 0 | 214.5 | 42.9 | 3.9 |
| After breaker | | | 6.8 |
| 1 | 140 | 28 | 6.6 |
| 2 | 47 | 9.4 | 6.5 |
| 5.5 | 6 | 1.2 | 6.3 |

EXAMPLE 5

Breaking at 95° F. (35° C.) a 60 lb/Mgal xanthan gum polymer in 3% KCl water containing 7.8 lb/Mgal citric acid using 175 lb/Mgal (21 g/L) sodium perborate, varied concentrations of ethyl acetoacetate, and 229 lb/Mgal (27.5 g/L) of potassium phosphate. The procedure for Example 5 was similar to that used in Example 2.

TABLE 5a

Break Data for Example 5 with 2.5 gal/Mgal Ethyl acetoacetate

| Time (hours) | Dial Reading | Viscosity (cP) | pH |
|---|---|---|---|
| 0 | 214.5 | 42.9 | 3.9 |
| After breaker | | | 6.7 |
| 1 | 191 | 38.2 | 6.6 |
| 2 | 172 | 34.4 | 6.6 |
| 5.5 | 9 | 1.8 | 6.7 |

TABLE 5b

Break Data for Example 5 with 5 gal/Mgal Ethyl acetoacetate

| Time (hours) | Dial Reading | Viscosity (cP) | pH |
|---|---|---|---|
| 0 | 214.5 | 42.9 | 3.9 |
| After breaker | | | 6.7 |
| 1 | 138.5 | 31.7 | 6.6 |
| 2 | 66 | 13.2 | 6.6 |
| 5.5 | 6 | 1.2 | 6.3 |

TABLE 5c

Break Data for Example 5 with 10 gal/Mgal Ethyl acetoacetate

| Time (hours) | Dial Reading | Viscosity (cP) | pH |
|---|---|---|---|
| 0 | 214.5 | 42.9 | 3.9 |
| After breaker | | | 6.8 |
| 1 | 108.5 | 21.7 | 6.6 |
| 2 | 35.5 | 7.1 | 6.5 |
| 5.5 | 6 | 1.2 | 6.3 |

TABLE 5d

Break Data for Example 5 with 15 gal/Mgal Ethyl acetoacetate

| Time (hours) | Dial Reading | Viscosity (cP) | pH |
|---|---|---|---|
| 0 | 214.5 | 42.9 | 3.9 |
| After breaker | | | 6.8 |
| 1 | 120.5 | 24.1 | 6.5 |
| 2 | 34 | 6.8 | 6.5 |
| 5.5 | 7 | 1.4 | 6.5 |

EXAMPLE 6

Breaking at 95° F. (35° C.) a 60 lb/Mgal xanthan gum polymer in 3% KCl water containing 7.8 lb/Mgal citric acid using 175 lb/Mgal (21 g/L) sodium perborate, 10 gal/Mgal (10 ml/L) ethyl acetoacetate, and varied concentrations of citric acid. The procedure for Example 6 was similar to that used in Example 2.

TABLE 6a

Break Data for Example 6 with 15 gal/Mgal Citric Acid at pH about 7

| Time (hours) | Dial Reading | Viscosity (cP) | pH |
|---|---|---|---|
| 0 | 214.5 | 42.9 | 3.9 |
| After breaker | | | 7.1 |
| 1 | 152.5 | 30.5 | 6.6 |
| 2 | 67 | 13.4 | 6.4 |
| 5.5 | 11 | 2.2 | 6.1 |
| 24 | 10 | 2 | 6.1 |

TABLE 6b

Break Data for Example 6 with 21 gal/Mgal
Citric Acid at pH about 6

| Time (hours) | Dial Reading | Viscosity (cP) | pH |
|---|---|---|---|
| 0 | 214.5 | 42.9 | 3.9 |
| After breaker | | | 6 |
| 1 | 193.5 | 38.7 | 5.9 |
| 2 | 102 | 20.4 | 5.8 |
| 5.5 | 17.5 | 3.5 | 5.6 |
| 24 | 11.5 | 2.3 | 5.6 |

TABLE 6c

Break Data for Example 6 with 33 gal/Mgal
Citric Acid at pH about 5

| Time (hours) | Dial Reading | Viscosity (cP) | pH |
|---|---|---|---|
| 0 | 214.5 | 42.9 | 3.9 |
| After breaker | | | 5.3 |
| 1 | 199 | 39.8 | 5.1 |
| 2 | 203 | 40.6 | 5.1 |
| 5.5 | 110 | 22 | 5.2 |
| 24 | 72.5 | 14.5 | 5.1 |

TABLE 6d

Break Data for Example 6 with 31.5
gal/Mgal Citric Acid at pH about 4

| Time (hours) | Dial Reading | Viscosity (cP) | pH |
|---|---|---|---|
| 0 | 214.5 | 42.9 | 3.9 |
| After breaker | | | 4 |
| 1 | 156.5 | 31.3 | 4 |
| 2 | 157 | 31.4 | 4 |
| 5.5 | 117 | 23.4 | 4.2 |
| 24 | 106.5 | 21.3 | 4.2 |

EXAMPLE 7

Breaking at 95° F. (35° C.) a 60 lb/Mgal xanthan gum polymer in 3% KCl water containing 7.8 lb/Mgal citric acid when the gel has been contaminated with 10% and 20% of 1.2 specific gravity ("S.G.") $CaCl_2$ brine using 75 lb/Mgal sodium perborate and 1.5 gal/Mgal Cu-EDTA+5.9 gal/Mgal Be HCl to obtain a pH between 4.5-5.5.

The procedure was as follows: Used 10 lb/gal $CaCl_2$ brine (242 grams CaCl2/Liter of water) to obtain 1.2 SG $CaCl_2$ brine. To prepare a xanthan gel, add 1 L water to a Waring blender jar; add 30 g KCl (3% by weight of water); add 0.94 g/L (7.8 lb/Mgal) citric acid; add 7.2 g/L (60 lb/Mgal) xanthan gum polymer; allow the gel to hydrate for 30 minutes to 1 hour; measure the pH and viscosity of the gel at the start and record those as the "0" time values.

Add 75 lb/MGal potassium perborate (9 grams potassium perborate/L gel)+1.5 gal/Mgal Cu-EDTA (1.5 mL Cu-EDTA/L gel) and 5.9 mL 20 Be HCl/L gel.

Contaminated a first sample with 10% $CaCl_2$ brine (225 mL of gel+25 mL of brine) and contaminate a second sample with 20% $CaCl_2$ brine (200 mL of gel+50 mL of brine)

Place a control sample and the two contaminated samples in a temperature controlled water bath at 95° F. and observe the break over a period of 24 hours. Viscosity readings were taken on a ⅕th spring Fann 35 Viscometer. The original readings were taken with the gel at room temperature. All other readings taken at 95° F. The readings need to be divided by 5 to be equivalent to a Fann 35 300 RPM reading with a #1 Bob and Sleeve.

The samples contaminated with $CaCl_2$ brine broke well under these conditions, however, the control sample did not completely break. Although not intended to be limited by any theoretical explanation, it is believed that the difference in pH between the control sample and the contaminated samples may have been a factor. The results are shown in Table 7.

TABLE 7

Break Data for Example 7 Using Perborate Activated with Cu-EDTA

| | Time (hrs) | 1 - Control Sample | | | 2 - Contaminated with 10% by volume of 10 lb/gal $CaCl_2$ brine | | | 3 - Contaminated with 20% by volume of 10 lb/gal $CaCl_2$ brine | | |
|---|---|---|---|---|---|---|---|---|---|---|
| Time | | Dial Rdg | Vis (cp) | pH | Dial Rdg | Vis (cp) | pH | Dial Rdg | Vis (cp) | pH |
| | Original Reading | 224 | 44.8 | 3.46 | 224 | 44.8 | 3.46 | 224 | 44.8 | 3.46 |
| 12:00 | After Additives | 213 | 42.6 | 5.37 | 186 | 37.2 | 4.55 | 151.5 | 30.3 | 4.36 |
| 15:57 | | 210 | 42 | 5.35 | 168 | 33.6 | 4.59 | 106 | 21.2 | 4.48 |
| Next day 10:22 | | 117.5 | 23.5 | 5.31 | 6 | 1.2 | 4.70 | 5.5 | 1.1 | 4.50 |

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A composition for treating a portion of a wellbore or a portion of a subterranean formation, the composition comprising:
   (a) water;
   (b) a source of hydrogen peroxide selected from the group consisting of inorganic persalts, alkali metal peroxides, organic peroxide, and hydrogen peroxide, and any combination thereof in any proportion;
   (c) a water-soluble alkanoyl-donor compound selected from the group consisting of: tetracetylethylenediamine, sodium nonanoyloxybenzenesulfonate, and any combination thereof in any proportion; and
   (d) a viscosity increasing polymer selected from the group consisting of: xanthan, diutan, and succinoglycan gums;
   wherein the pH of the composition is adjusted in the range of 3 to 8.

2. The composition according to claim 1, wherein the alkanoyl-donor compound is present in a concentration of at least 0.5% by weight.

3. The composition according to claim 1, further comprising: a pH adjusting compound for adjusting the pH of the composition.

4. The composition according to claim 1, wherein the viscosity increasing polymer comprises xanthan.

5. The composition according to claim 1, wherein the source of hydrogen peroxide is an inorganic persalt selected from the group consisting of alkali perborates, percarbonates, and perphosphates.

6. The composition according to claim 1, wherein the source of hydrogen peroxide is an inorganic persalt selected from the group consisting of sodium perborate monohydrate, sodium perborate tetrahydrate, sodium percarbonate, and sodium pyrophosphate peroxyhydrate.

7. The composition according to claim 1, wherein the composition further comprises: sand, gravel, resin-coated proppant, or synthetic proppant.

* * * * *